…

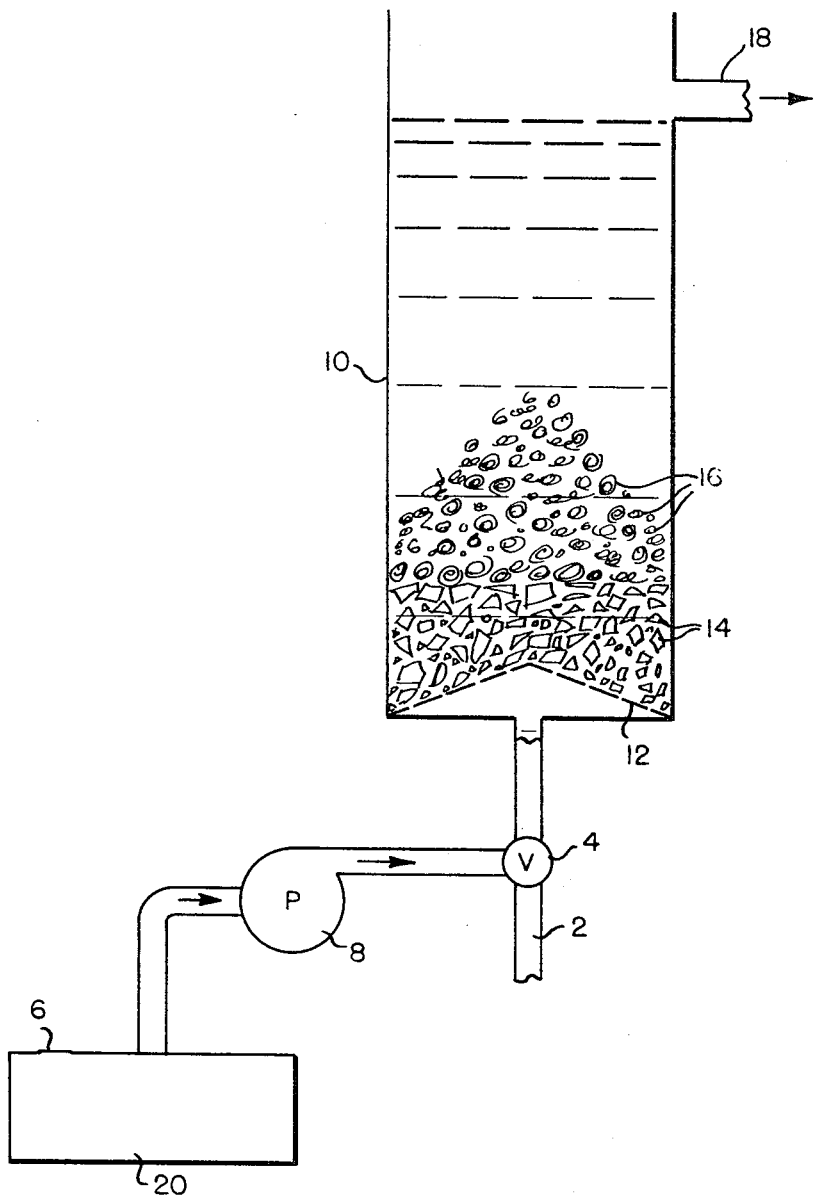

United States Patent Office 3,674,466
Patented July 4, 1972

3,674,466
REMOVAL OF COPPER FROM AQUEOUS SOLUTIONS WITH HIGHLY STRESSED, ACTIVATED FERROUS METALS
John Ray Anderson, Cranbury, N.J., and Richard Peck Hollingworth, Yardley, Pa., assignors to Sybron Corporation, Rochester, N.Y.
Filed May 18, 1970, Ser. No. 38,018
Int. Cl. C22b 15/12
U.S. Cl. 75—109                                15 Claims

ABSTRACT OF THE DISCLOSURE

The removal of copper from aqueous copper-containing solutions is accomplished by passing an aqueous copper-containing solution at a pH of about 6.5 to 10.5 through a column containing a highly stressed form of ferrous metal which has been activated by treatment first with a degreasing agent and then with an inorganic acid. A ferrous metal complexing agent added to the aqueous copper-containing solution prior to passage through the column of metal prevents ferrous ion precipitation in the treated solution.

BACKGROUND OF THE INVENTION

This invention relates to a process for the separation of copper from aqueous copper-containing solutions, and more particularly, it relates to a process for reducing copper ions and the copper in copper complexes in aqueous solutions to metallic copper.

Since most aqueous copper solutions are toxic (all soluble salts of copper being highly toxic), waste materials plating baths and etching baths containing aqueous copper solutions cannot be discarded directly as waste. The toxic copper compounds must be removed before discarding. Heretofore, the copper values have been removed in the form of sludges which result from chemical treatment. Such treatment is expensive and requires extensive manipulation in handling the sludge. Furthermore, the sludes do not easily yield the copper value contained therein and are usually diverted to waste. This method is further complicated by the fact that waste copper plating and copper etchant baths usually contain agents that form stable, water-soluble complexes with copper. The stability of these complexes is so great that removal of the copper therefrom is economically unfeasible by this prior art technique.

Another method for the removal of copper from aqueous copper-containing solutions has been the addition of scrap iron to a vessel containing an aqueous copper-containing solution wherein copper plates out on the iron and the liquor still containing unremoved copper is decanted after no additional copper plates out on the iron. This method has several disadvantages in that the process is intermittent; it is accomplished only by cumbersome materials handling; it results in incomplete removal of the copper metal; and it does not sufficiently remove copper present in waste solutions in the form of stable, water-soluble complexes.

Several processes for the removal of copper from aqueous copper-containing solutions by the addition of scrap iron or sponge iron to special vessels and devices are disclosed in U.S. 3,154,411; U.S. 3,288,598; U.S. 2,716,600; U.S. 3,194,653; U.S. 3,288,599; U.S. 1,971,416 and U.S. 3,424,575. These processes utilize either agitation, turbulence, tumbling, churning, levitation, and dynamic suspension of the iron in the treatment vessel where the copper precipitates, or mere addition of the iron particles to the treatment vessel containing the copper solution where the copper precipitates out over a given period of time and the copper depleted liquid is decanted or otherwise removed. Metallic copper is removed from the iron particles by utilizing forces which cause the copper precipitate to dislodge from the iron and generally flotation methods are used to separate copper and iron. The methods of copper removal disclosed in these processes have several disadvantages in that several of them are intermittent, and those which are continuous must have complicated devices to collect metallic particles and handle pulps and residues. Furthermore, iron particles are wasted without full utilization of the iron content thereof and copper removal is incomplete resulting in copper-containing effluents which cannot be discharged into bodies of water and sewer systems under present-day standards and requirements for such discharge. Other disadvantages of these prior art processes are the release of excessive qaunities of hydrogen gas and the precipitation of iron salts, e.g., ferrous sulfate.

OBJECTS OF THE INVENTION

Accordingly, it is the object of this invention to provide an economic, compact, single-step process for the separation of copper from aqueous copper-containing solutions and from stable, water-soluble copper complexes.

It is another object of this invention to recover copper values in the essentially pure metallic form rather than in difficult-to-separate sludges and mixtures with particulate iron and iron precipitates.

It is still another object of this invention to provide a process for the removal of toxic copper ions from the waste liquors of copper plating and etching baths.

It is still another object of this invention to provide a continuous process for the isolation of copper metal from aqueous copper-containing solutions and copper complexing agents by an economic, compact materials handling system.

Still another object of this invention is to provide a highly stressed activated ferrous metal for the continuous removal of copper from an aqueous copper-containing solution.

Another object of this invention is to provide a continuous process for the isolation of copper metal from aqueous copper-containing solutions without precipitation of ferrous and ferric compounds and with minimum evolution of hydrogen gas.

Another object of this invention is to provide for essentially complete utilization of nearly all ferrous metal during the copper precipitation which is carried out in the presence of said ferrous metal in the removal of copper from aqueous copper-containing solutions.

Other objects and advantages of this invention will become apparent from the following detailed description.

SUMMARY OF THE INVENTION

We have found that highly stressed, activated ferrous metals promote the removal of copper from aqueous copper-containing solutions, and that copper removal is substantially complete by the continuous passage of the aqueous copper-containing solution through a bed of the highly stressed, activated ferrous metal.

In general the process of separating metallic copper from an aqueous copper-containing solution in accordance with this invention is accomplished by contacting a highly stressed ferrous metal which has been activated by treatment with a mineral acid, with an aqueous copper-containing solution having a pH of 10.5 or less. However, any suitable metal more active than copper in the electromotive force (E.M.F.) series may be used. We have unexpectedly found that the metallic copper first plates out on the surface of the ferrous metal in that portion of the bed which is first contacted by the aqueous copper-containing solution and continues to plate out on the copper surface itself while the ferrous metal in other portions of the bed dissolves. Copper plates out on copper to such an extent in this operation that copper extends into the lower portions of the column which are used to support the iron.

By ferrous metals we mean that class of metals consisting of iron and iron alloys, such as, steel, stainless steel and cast iron, and generally defined as metals of, relating to or containing iron. Other metals, such as aluminum and magnesium which are even more active than iron, may also be used in the process of this invention, as well as any suitable metals more active than copper in the E.M.F. series.

Aqueous copper-containing solutions are defined as a water medium having cuprous ions, cupric ions and/or copper complexed with copper complexing agents partially or completely dissolved therein. The term aqueous copper-containing solutions is not meant to exclude contaminants, other ingredients and those chemicals ordinarily found in metal plating and etching baths and electrolyte solutions.

A highly stressed ferrous metal is a ferrous metal which has been subjected to a deformation or change in form by an external force or load and remains in a highly strained condition after such deformation, as in very thin steel turnings, millings, chips, shavings and the like. Metal turnings, millings, chips, shavings and the like and combinations thereof have been designated as metal fragments. The highly stressed ferrous metals are characterized by a multiplicity of disparities and cracks.

Activated ferrous metals may be defined as ferrous metals which have been degreased with a grease solubilizing and/or removing agent followed by treatment with an inorganic acid. Activation here means that oxide coatings and traces of grease on the ferrous metal are removed and active surfaces of energized iron atoms are generated and exposed. Some of these active surface areas are cathodic to the copper solution while others are anodic. Means of activation are well known in the art.

We have found that the process of this invention may be used to remove the copper content from a liquor or aqueous medium of copper-containing plating baths, etchants, electrolyte solutions, and the like in the form of metallic copper. In accordance with this invention metallic copper can be removed from any aqueous system containing cuprous or cupric ion not only in the ionic form but also in the form of complexes with a complexing agent. The susceptibility of the iron in the ferrous metal to attack by copper ions is enhanced by the highly stressed form of the metal fragments and by the activation of the iron, the practical results of which are to reduce the time required for complete reduction of copper as well as to raise the capacity of the ferrous metal to plate out the copper.

We have also unexpectedly found that periodic reactivation of the highly stressed ferrous metal and continued passage of aqueous copper-containing solutions through the column permits substantially complete replacement of all ferrous metal by copper in the column.

BRIEF DESCRIPTION OF THE DRAWING

The drawing represents a vertical, cross-section of a column containing a bed of highly stressed, activated ferrous metal fragments, in which the preferred mode of this invention is carried out.

DESCRIPTION OF THE PREFERRED EMBODIMENTS

In the preferred form of the invention, highly stressed iron or steel turings, millings, chips, shavings and the like are first degreased with a grease solubilizing or removing agent. These highly stressed ferrous metal fragments are thin and have many disparities and cracks on the surface. Secondly, the highly stressed iron or steel is further activated by a treatment with dilute solution of a mineral acid, said treatment either carried out separately or incorporated in the aqueous solution of copper to be treated. The aqueous copper-containing solution is then run preferably up-flow in a column of the activated iron or steel, the column being of such length and dimensions to provide a sufficient residence time for the copper solution to be depleted of copper to the desired level of depletion. By residence time we means the volume of the free space in the column divided by the flow rate of the influent solution.

Although the invention is operable at any pH of 10.5 or less, in the preferred embodiment of the invention the influent solution is held at a pH that is just above that for incipient attack of protons on the activated iron or steel, that is at a pH of from about 6.5 to about 10.5 at which pH there is minimal attack by protons while still maintaining sufficiently rapid attack by copper ions in solution or copper ions in solution as complexes with complexing agents. Although the invention may be used at a pH of 0 to 6.5, it is not the preferred mode due to the evolution of hydrogen gas and the loss of ferrous ion. At a pH of about 6.5 to 10.5 only one equivalent of iron is brought into solution for each equivalent of copper reduced. In this way the amount of steel consumed for reducing a given amount of copper is minimized because little or none of it is wasted to produce hydrogen, and further, the change of pH of the solution during the treatment is also minimized.

The hydrogen ion concentration of the various aqueous copper-containing solutions which may be treated in accordance with the process of this invention, varies. When the pH of the aqueous copper-containing solution to be treated falls within the preferred pH range of from about 6.5 to 10.5 the hydrogen ion concentration of the solution will not have to be adjusted. When it is necessary to adjust the pH of the aqueous copper-containing solution from a more acidic hydrogen ion concentration to the preferred pH range, it is necessary to add a water soluble base such as the alkali metal hydroxides. Any base which will form a water soluble salt in the acid solution and will not interfere with the release of the cuprous or cupric ion or the copper complexes in the aqueous solution may be used to adjust the pH. In order to adjust the hydrogen ion concentration of those aqueous copper-containing solutions having a pH in excess of 10.5 any suitable inorganic acid which will not interfere with the copper content of the solution or the copper which has plated on the ferrous metal may be used. Such acids as hydrochloric, sulfuric acid, nitric acid and the like may be used.

The ferrous metal to be activated in accordance with the process of this invention should be free of oil, grease, grime, and other forms of dirt and contamination before it can be treated with the inorganic acid. Thus, the ferrous metal should be first degreased with a grease solubilizing or removing agent. Any suitable material may be used which will remove the material which contaminates the surface of the metal. Such agents as ethylene dichloride, acetone, detergents in water, steam, other organic solvents and the like may be used. In the absence of grease, oil, dirt, grime and the like on the surface of the metal, the initial degreasing step may be eliminated. After the ferrous metal has been cleaned, it is further activated by a treatment by a dilute solution of an inorganic acid. Any inorganic acid may be used to activate the ferrous metal. Illustrative of these acids is hydrochloric acid, sulfuric acid, nitric acid, sulfamic acid, hydrofluoric acid, and the like. Hydrochloric acid is the preferred acid for activation of the ferrous metal. Although dilute solutions of the acids are suitable for activating the metal, concentrated acid solutions may also be used. The preferred range of inorganic acid concentration suitable for activating the ferrous metals is from about 1.0% to 10.0% acid.

During the operation of the process of this invention, the activated ferrous metal may become less active because of surface oxidation or precipitation of hydrated oxides on the surface and the like. In such event, the ferrous metal can be reactivated by additional acid treatment with a dilute solution of an inorganic acid. However, those acids which will attack the copper which has plated out on the surface of the ferrous metal should not be used in this reactivation. We have found during experimentation that periodic reactivation of the ferrous metal with dilute hydrochloric acid having a concentration of about 1.0% to 10.0% acid causes a substantial increase in the capacity of the ferrous metal to remove copper from aqueous copper-containing solutions. Such reactivation is applied when leakage of cupric ion into the effluent reaches an unacceptable level. The reactivation acid may be added directly to the aqueous copper-containing solution and passed through the column during treatment, or it may be passed through the column separately from the copper-containing solution.

Although the invention may be practiced by intermittently contacting the highly stressed, activated ferrous metal with an aqueous copper-containing solution and decanting the remaining liquor from the vessel, it is preferred that this invention be practiced by a continuous method wherein the aqueous copper-containing solution passes through a column containing highly stressed, activated ferrous metal as shown in the drawing. In our experimental work the aqueous copper-containing influent 20 was introduced from influent tank 6 with a suitable pump, designated by numeral 8, a flow regulator (not shown) and a valve system 4, into the base of a column or cylindrical vessel 10. The base of the column or cylindrical vessel contains an underdrain 2, a disperser of influent 12, and a support system 14, for the highly stressed ferrous metal bed 16, contained in column 10. Support system 14 may be broken fragments of glass, stones and the like. The column is made of a material strong enough to contain the ferrous metal and inert to the liquids which pass therethrough. The top of the column has an effluent exit 18, through which the effluent may be withdrawn and passed to a drain or to a tank for further treatment. Various outlets along the column (not shown) can be installed for sampling or short circuiting the flow of effluent. Equipment (not shown) may be installed for ready introduction of reactivating (inorganic) acid. Operation of the column can be made continuous or intermittent.

In the preferred embodiment the aqueous copper-containing solution 20, in tank 6 is forced by pump 8 into the bottom of column 10 through influent disperser 12. It then passes upward through the bed in the spaces between highly stressed ferrous metal 16 in column 10 and exits from the top of the column through effluent exit 18. The highly stressed ferrous metal fragments remain stationary in the bed, that is, there is little or no movement of the fragments due to the flow of the liquor, acid or other fluids. We have found that the upflow of the aqueous copper-containing solution facilitates control of residence time. It is possible to draw off or remove the contents of that portion of the column which has been converted substantially to copper and add fresh activated ferrous metal at the top of the column. Although the preferred mode of operation is in an upflow direction, this invention would also effectively remove copper from aqueous copper-containing solutions if the equipment were adapted to operate in a downflow cycle, that is, if the influent entered the column at the top and passed downward through said column to exit at the bottom of the column.

In order to allow for the increasing volume of the metallic material in the column due to the plating out of the copper on the activated metal surface, we have found that it is desirable in the preferred mode of this invention that the ratio of volumes occupied by the liquid and the iron in the column or vessel be about 4 to 1 at the beginning of the process to permit sustained and economic practice of the invention. Thus, for every volume of activated ferrous metal which is initially used in the column, it is preferred that there be a ratio of 4 volumes of column space occupied by the aqueous copper-containing solution. This is due to the fact that the cupric ion is preferentially reduced to metallic copper near the influent end of the column. The use of the highly stressed ferrous metal fragments having many surface cracks and disparities induces this buildup of copper near the influent end of the column. The metallic copper first plates out on the surface of the ferrous metal near the influent end of the column to form a multiplicity of cathodes and continues to plate out on the copper surface while the ferrous metal dissolves anodically. Such buildup of copper metal on copper metal in the presence of activated ferrous metal which is eventually replaced by copper, occupies progressively more of the volume initially occupied by the liquid.

The ideal capacity of such a system for the removal of copper by activated ferrous metal, ideal capacity being defined as the weight of copper reduced per unit weight of iron, is calculated as 1.137 lbs. of copper metal per 1.000 lb. of iron. The calculation was made by utilizing the standard equation for the reduction of cupric ion by iron. We have found that in systems in which the relative volume occupied by the influent is over 80%, build-up of copper can be accommodated to at least 40% of the ideal capacity without clogging. In the preferred mode of this invention we have been able to obtain at least 0.6 lb. of copper metal plated for each lb. of activated ferrous metal.

Ferrous ion or any other metal ion of the metal fragments used in this invention brought into solution by the plating out of the copper metal may form a precipitate which can cause clogging of the column. Since the practice of the preferred mode of the invention depends on continuous flow of the aqueous copper-containing solution through a porous bed of highly stressed, activated ferrous metal, that is, through the passages between the highly stressed, activated ferrous metal fragments, it may be necessary to add a ferrous metal complexing agent to prevent such precipitation and thereby prevent the clogging. The precipitation of the ferrous ion takes place at a pH above 3.5. Accordingly, when the pH of the aqueous copper-containing solution is above 3.5, precipitation may become a problem. Normally, the aqueous copper-containing solutions which have been obtained from copper plating or etching baths, contain cupric ion complexing agents. These complexing agents may also form stable, water-soluble ferrous and ferric ion complexes. When the copper is removed from these cupric ion complexing agents, the complexing agents are then free to complex with the ferrous and ferric ions in the solution and thereby prevent the precipitation. Examples of complexing agents which may be used in the practice of this invention, are the tartrates, ethylenediamine tetraacetic acid, 1,2-diaminocyclohexane-N,N,N',N'-tetraacetic acid and derivatives thereof. Normally there is approximately one mol of agent per every mol of copper present. However, to prevent the ferrous and ferric ions from precipitating not less than 0.1 mol of complexing agent may be used. Ions from metal fragments other than ferrous metals used as a bed in the column may also precipitate, and suitable complexing agents added to the aqueous copper-containing solution may also be employed to prevent precipitation.

When the concentration of copper in the effluent of a treatment column reaches undesirable levels, a polishing column may be added to the system in such a way that the effluent of the treatment column becomes the influent of the polishing column. The polishing column is generally similar to the treatment column in construction but may be smaller in dimension, and it contains a bed of highly stressed, activated ferrous metal fragments. The polishing column may be used to extend the life of the treatment column.

In another mode of this invention a series of treatment columns have been joined by connecting the effluent end of one treatment column to the influent end of another treatment column. This series type of connection may be utilized in any desirable plurality of treatment columns. This type of system permits the utilization of all ferrous metal in a treatment column extending the operation of the column until essentially all of the ferrous metal in the column has become ferrous ion, and the column is essentially filled with metallic copper. For example, in a system utilizing three treatment columns connected in series, the first column initially removes most of the copper, and the second and third treatment columns serve as polishing columns. When the first treatment column approaches exhaustion, then the second treatment column removes most of the copper from the solution and the third treatment column becomes a polishing column. When the first treatment column is completely exhausted, that is, when it is essentially filled with metallic copper, it may be removed from the system. When the copper concentration in the effluent from the third treatment column reaches undesirable levels, then the influent end of a fourth column containing fresh, highly stressed, activated ferrous metal may be connected to the effluent end of the third column. This cycle is repeated as desired. Reactivation of the highly stressed ferrous metals in the plurality of columns may also be carried out by using inorganic acids. Ferrous ion complexing agents may also be used in the aqueous copper-containing solution treated in a pluarlity of columns.

The following example illustrates more clearly the principles and practice of the invention to those skilled in the art.

Example 1

Activation of ferrous metal.—Very thin, mild steel turnings having many surface irregularities and cracks were soaked in trichloroethylene overnight until the oil and grease film was removed from the surface of the shavings. The solyent was decanted, and the shavings were rinsed three times with fresh solvent and allowed to dry.

The washed and degreased turnings weighing forty-eight (48) pounds were placed in a six-foot, 4¼ inch I.D. butyrate tube (decribed above). The column was then filled with a 10% solution (by volume) of hydrochloric acid. The hydrochloric acid remained in the column for 1 hour.

Removal of copper from waste plating bath.—A synthetic waste aqueous copper-containing solution having the following composition was prepared:

(a) 4000 p.p.m. cupric ion (copper sulfate)
(b) 1 mol EDTA [1]/mol of cupric ion
(c) 1 mol Rochelle salt/mol of cupric ion
(d) 25,000 p.p.m. sodium chloride
(e) sodium hydroxide
(f) water The pH of the synthetic aqueous copper-containing solution was adjusted to 8.5 with hydrochloric acid. The copper-containing solution having a pH of 8.5 was introduced into the column containing the bed of ferrous metal and hydrochloric acid. The hydrochloric acid was displaced by the copper-containing solution. The aqueous copper-containing solution was passed upflow through the column. The concentration of the copper was measured in p.p.m. in the effluent samples taken during recorded intervals.

The concentration of the copper in the effluent from the six-foot column ranged from 9 p.p.m. initially, 5 p.p.m. after 22.0–23.5 hours, 2 p.p.m. after 42.0–43.5 hours and less than 1 p.p.m. after 112.5–114.0 hours A polishing column 1 foot in length was filled with 7½ pounds of the same degreased, highly stressed mild steel

[1] EDTA=ethylenediaminetetraacetic acid. The pH of the synthetic solution was above 12.0.

turnings as used in the six foot column. The influent end of the one foot column was connected to the effluent end of the six foot column. The steel turnings in the one foot column were treated with hydrochloric acid. After 21.5 hours of operation of the six foot column, all effluent from the six foot column entered the influent end of the one foot column and passed upflow through the bed of highly stressed metallic fragments. The concentration of the copper in the effluent from the one foot polishing column ranged from 1 p.p.m. initially, less than 1 p.p.m. after 2.0 hours, and less than 1 p.p.m. after 120.5 hours of operation.

No precipitate of ferrous compounds occurred in the column or in the effluent liquor. Essentially, pure copper plated out initially in the lower regions of the column and progressively plated out in regions extending from the lower regions to the upper regions of the column. The plated copper is visible in clear plastic columns and is easily discernible due to the characteristic copper color. The plated or precipitated copper appears as a solid "slug" or mass within the column.

A method for the continuous removal of copper from aqueous copper-containing solutions has been provided by passing said solutions through a bed of a highly stressed, activated ferrous metal in a column. Copper in the form of cuprous and cupric ions in the ionic form and in stable complex forms in aqueous copper-containing solutions has been removed therefrom and plated out in the metallic form on activated ferrous metal turnings, chips, shavings and millings and on plated copper. This method also has provided a means for replacing essentially all of the ferrous metal in a column with metallic copper. Continuous removal of copper from aqueous copper-containing solutions resulting in an effluent of less than 1 p.p.m. copper has also been provided.

The above examples are not meant to limit the scope of the invention or the applications to which this invention may be directed. It is to be understood that although the invention has been described with specific reference to particular embodiments thereof, it is not to be so limited, since changes and alterations therein may be made which are in the full intended scope of this invention as defined by the appended claims.

We claim:

1. A process of removing copper from an aqueous copper-containing solution comprising passing said aqueous copper-containing solution having a pH of about 10.5 to about 0 through a bed of highly stressed, activated metal fragments selected from the group consisting of ferrous metals, aluminum and magnesium, whereby copper is plated out on said highly stressed, activated metal fragments and on copper to form a bed comprising a solid copper body.

2. A process in accordance with claim 1 wherein said highly stressed, activated metal fragments are selected from the group consisting of turnings, shavings, millings, chips and combinations thereof, said metal fragments having surface disparities and cracks.

3. A process in accordance with claim 1 further comprising adjusting the pH of the aqueous copper-containing solution to about 6.5 to 10.5 with an agent selected from the group consisting of a water soluble base and an inorganic acid.

4. A process in accordance with claim 1 further comprising adding a metal complexing agent to said aqueous copper-containing solution prior to passing said solution through the activated metal fragments to prevent the precipitation of compounds formed from the ions of the metal fragments which enter the solution as the copper plates out.

5. A process in accordance with claim 1 further comprising passing the effluent from said bed of highly stressed, activated ferrous metal fragments through at least one additional stationary bed of highly stressed, activated ferrous metal fragments.

6. A process of treating a waste aqueous copper-containing solution having agents that form stable water-soluble copper complexes comprising:
   (a) adjusting the pH of the aqueous copper-containing solution to about 6.5 to 10.5 with an agent selected from the group consisting of a water soluble base and an inorganic acid; and
   (b) passing said aqueous copper-containing solution having said agents that form stable water-soluble copper complexes, through a column containing highly stressed, activated ferrous metal fragments, said metal fragments having been activated by degreasing with a suitable grease removing agent and treating with a dilute solution of inorganic acid, whereby copper contained in the aqueous copper-containing solution in the form of stable water-soluble copper complex is removed and plates out on said highly stressed activated ferrous metal fragments and copper to form a solid body comprising copper in said column, and ferrous ions released by said activated ferrous metal fragments form stable water-soluble complexes with the complexing agent.

7. A process of treating a waste aqueous copper-containing solution in accordance with claim 6 further comprising periodically contacting the copper plated, highly stressed, activated ferrous metal fragments with a dilute solution of inorganic acid.

8. A process in accordance with claim 7 wherein the dilute solution of inorganic acid is about 1.0% to 10.0% (by volume) hydrochloric acid.

9. A process of recovering metallic copper from an aqueous copper-containing solution comprising:
   (a) adjusting the pH of the aqueous copper-containing solution to about 6.5 to 10.5 with an agent selected from the group consisting of a water soluble base and an inorganic acid;
   (b) passing said aqueous copper-containing solution through at least one treatment column containing a bed of highly stressed, activated ferrous metal fragments whereby copper in said aqueous copper-containing solution precipitates and plates out on said highly stressed activated metal fragments and on plated out copper metal to form a copper metal slug; and
   (c) removing said copper metal slug from said column.

10. A process in accordance with claim 9 further comprising passing the effluent from a first treatment column through at least one additional second treatment column containing a bed of highly stressed, activated ferrous metal fragments whereby copper in said aqueous copper-containing solution is passed through said first treatment column until essentially all ferrous metal fragments have been replaced by metallic copper and residual copper in the effluent of said first treatment column is removed in said additional second treatment column.

11. A process in accordance with claim 10 wherein said first treatment column having essentially all ferrous metal fragments replaced by metallic copper is removed and said aqueous copper-containing solution passes through said additional second treatment column.

12. A process in accordance with claim 9 further comprising a plurality of treatment columns containing beds of highly stressed activated ferrous metal fragments, said columns being serially arranged and having as an influent stream, the effluent stream of the preceding column.

13. A process in accordance with claim 9 further comprising adding a ferrous metal complexing agent to said aqueous copper-containing solution prior to passing said solution through the activated ferrous metal fragments to prevent the precipitation of ferrous and ferric compounds.

14. A process in accordance with claim 9 further comprising periodically contacting the copper plated, highly stressed, activated ferrous metal fragments with a dilute solution of inorganic acid.

15. A process in accordance with claim 14 wherein the dilute solution of inorganic acid is about 1.0% to 10.0% (by volume) hydrochloric acid.

References Cited
UNITED STATES PATENTS

| | | | |
|---|---|---|---|
| 1,753,015 | 4/1930 | McGregor | 75—109 |
| 3,288,599 | 11/1966 | Keyes | 75—117 X |
| 3,282,682 | 11/1966 | Harlan | 75—117 |
| 2,292,207 | 8/1942 | Dearing | 75—109 |
| 3,117,000 | 1/1964 | Schlain et al. | 75—109 |
| 1,963,893 | 6/1934 | Drouilly | 75—109 |
| 1,431,130 | 10/1922 | Soulie-Cottineau | 75—117 |

GEORGE T. OZAKI, Primary Examiner

U.S. Cl. X.R.

75—117